Oct. 13, 1959 G. H. FRITZINGER 2,908,767

JUKE BOX AND RECORDATION-TRANSFER MACHINE THEREFOR

Filed June 18, 1954

INVENTOR

George H. Fritzinger

United States Patent Office 2,908,767

Patented Oct. 13, 1959

2,908,767

JUKE BOX AND RECORDATION-TRANSFER MACHINE THEREFOR

George H. Fritzinger, West Orange, N.J., assignor, by mesne assignments, to McGraw-Edison Company, Elgin, Ill., a corporation of Delaware Application June 18, 1954, Serial No. 437,679

9 Claims. (Cl. 179—100.2)

This invention relates to juke boxes which employ a magnetizable record medium bearing a plurality of separate recordations, and control means for selectively playing the recordations. More particularly, the invention relates to magnetic-type juke boxes and to coordinated recordation-transfer machines which are adapted to enable easy erasure and replacement of selected older or less popular musical numbers by new or more popular ones taken from master recordings placed in the transfer machine.

An object of the invention is to provide a juke box with novel features to enable the practical use of magnetizable record mediums in such machines. A magnetic record medium is particularly suitable for use in a juke box because it permits selected recordations to be easily erased and replaced by more popular numbers without changing the record medium itself in the juke box. Also, many musical numbers can be recorded on a single magnetic record medium to enable selective playing thereof by very simple apparatus. For instance, the record medium may consist of one or more endless tapes each bearing a number of side-by-side sound tracks, and selection of musical numbers can be made simply by shifting a single reproducer from one track to another or by shifting circuit connections from one head to another if a plurality of heads are used. This ease of selection enables great simplification in the juke box mechanism over that of present day juke boxes employing complicated disk-record changing apparatus.

The ease with which recordings on a magnetic record medium can be erased and the medium be re-recorded upon opens a new technique of servicing and maintaining a juke box. For example, an authorized serviceman for the juke boxes in a given area may be equipped with a special transfer machine in which he can play master recordings and make transfers therefrom to the record medium of the juke box in replacement of old recordations no longer popular. A saving is therefore achieved since the record medium in each juke box can be re-recorded on many times before it need be replaced.

It is an object of my invention to provide a juke box and transfer machine by which any selected recordation in the juke box can be erased and a new recordation recorded in its place simply by connecting the transfer machine to the juke box, positioning the selector control at the recordation to be replaced and starting the juke box.

Another object is to provide safeguarding features in such juke box-transfer machine systems, which is adapted to enable only authorized servicemen to make recordation replacements in the juke box. A further object in this respect is to provide a sealed cabinet for the juke box and/or a locked control mechanism which must be unlocked as by a special key available only to authorized servicemen before connections can be completed to transfer a recordation to the juke box.

Another object is to provide a counter system operative automatically to register the number of transfers made to the juke box.

These and other objects and features of my invention will be apparent from the following description and the appended claims.

In the description of my invention reference is had to the accompanying drawings, of which:

Figures 1, 2, 3, 4, 5:
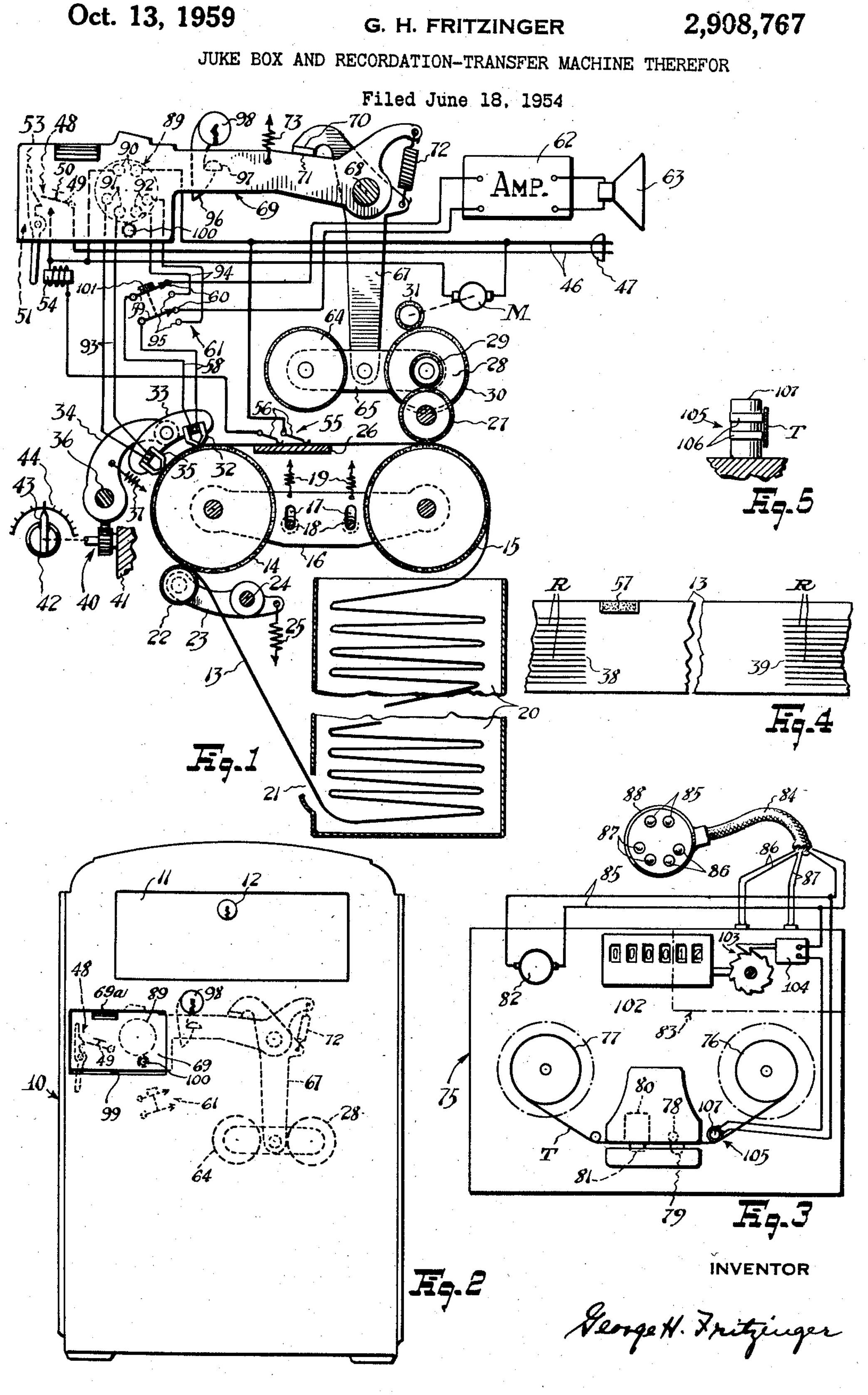
Figure 1 is a diagrammatic view of circuits and mechanism of a juke box incorporating my invention.
Figure 2 is a rear view of a cabinet for a juke box showing features of my invention adapted to prevent other than authorized servicemen from transferring new recordations to the juke box.
Figure 3 is a diagrammatic view of a transfer machine for playing master records and making transfers to a juke box.
Figure 4 is a view of a portion of the magnetic record tape used in the juke box in which the recorded tracks are indicated by straight lines.
Figure 5 is a fractional view of a control post on the transfer machine for controlling a counter system to register the number of transfers made from the transfer machine to a juke box.

The juke box mechanism is installed in any suitable cabinet 10 which is locked closed to prevent access thereto except by authorized servicemen. Such access as may be required may be had, for example, by way of a panel 11 which can be opened by a key-operable lock 12. The mechanism is adapted for operation with a magnetic record medium which may for example be in the form of a wide endless belt or tape 13 coated with magnetizable particles. The tape is trained over two spaced rollers 14 and 15 journalled to a frame plate 16. The frame plate has vertical slots 17 engaged by respective studs 18 to provide the plate with vertical freedom of movement, and is urged upwardly by springs 19. The excess length of the endless tape is looped back and forth in a bin 20 open at the top and having a side opening 21 at the bottom. As the tape leaves the right roller 15 it falls in looped fashion into the bin, and as the tape is drawn onto the roller 14 it is pulled from the bottom of the bin through the opening 21, all in a manner well known in the art. To provide for tautening of the tape between the rollers and around the roller 14 a friction roller 22 is urged against the tape backed by the lower portion of the roller 14, the roller being journalled to a lever 23 itself pivoted at 24 to the frame and spring-urged by a tension spring 25. Between the rollers 14 and 15 there is a stationary plate 26 providing backing for the reach of tape between the rollers.

The drive mechanism comprises a capstan 27 which frictionally engages the tape backed by the roller 15 under pressure of the upward urging of the roller. The capstan is driven by a stepped friction roller 28 having an inner periphery 29 engaging the capstan and an outer periphery 30 engaging a drive roller 31 on the shaft of a motor M. This friction drive train may be adapted to propel the tape at a linear speed of either 3¾" or 7½" per second as is standard practice.

Engaging the tape backed by the roller 14 is a recorder-reproducer head 32 mounted on one end of a rocker 33 pivoted at its central portion to a carriage 34. On the other end of the rocker there is an erase head 35 in line with the head 32 as with respect to the direction of travel of the tape therebetween. The carriage 34 is mounted on a cross rod 36 and is urged as by a spring 37 to bring pressure of the two heads 32 and 35 against the tape backed by the roller 14.

The tape may have such length as to provide for separate side-by-side single-track recordings R lengthwise thereof. Each such recording is to be of normal playing time, say four to five minutes, but is not to run the full length of the tape so as to provide an idle length of, for example, several feet between the start and end points of the separate recordings, as illustrated in Figure 4. For example, the separate side-by-side tracks may start at line 38 and terminate at line 39. For a four-minute recording at a tape speed of 7½" per second the active length of the tape would then be 150', and the total length would be of the order of 155'.

To provide for individual selection of the separate recordations the carriage is shiftable on the rod 36 as by a rack and pinion arrangement 40. The pinion may be journaled in a frame element 41 (fractionally shown) and may be turned manually by means of a knob 42. The knob 42 has a pointer 43 which moves over a scale 44 having registration marks for the respective recordations, it being understood that when the pointer 43 is moved into registration with one of the marks the record-reproduce head 32 will be aligned with the sound track having the recordation corresponding to that mark.

The drive motor M is energized by a circuit 46 leading from a plug 47 and serially including a switch 48. This switch has a movable pole member 49 spring-urged into open position but manually movable by a knob 50 into closed position, in which position it becomes latched by a spring-urged pawl 51. Opening of the motor switch is effected by releasing the pawl 51. This may be done manually by a handle 53 on the pawl or by an electromagnet 54.

The electromagnet 54 is used for stopping the drive motor automatically at the end of playing each recordation on the tape. For this purpose the electromagnet is connected in the circuit 46 through the motor switch 48 and through a switch 55 controlled by the tape. This switch 55 comprises two switch arms 56 yieldably urged against the tape backed by the plate 26. On the idle length of the tape between the start and stop lines 38 and 39 there is a strip 57 of conductive material aligned for momentary bridging contact with the switch arms 56 at the end of playing of each recordation R. As the switch 55 is closed, the electromagnet 54 is energized to release the pawl 51 and permit the switch 48 to open in response to its own biasing.

In all juke box playing operations, the head 32 serves only as a reproducing head to provide electric impulses according to the magnetically recorded signals on the record medium. These electric impulses are fed through the circuit 58 via pole elements 59 and respective contacts 60 of a double-pole double-throw switch 61, and through an amplifer 62, to a loudspeaker 63. During all of these playing operations the erase head 35 is not energized and is inoperative.

The foregoing juke box mechanism is intended to be illustrative and not necessarily limitative as with respect to the further features of my invention hereinafter described.

In order to replace any selected recordation on the tape, the erase head must be energized and a recording signal with suitable bias voltage must be fed to the record-reproduce head 32. Preferably, for time-saving purposes, the tape is driven at several times normal speed during each recordation replacement operation—which it will be understood is permissible if the master record from which the new recordation is obtained is likewise driven at a correspondingly higher speed. To provide for such several times greater drive speed, the intermediate stepped roller 28 is replaceable in the drive train by a simple roller 64. For this purpose the rollers 28 and 64 are journaled to opposite end portions of a rocker beam 65, which in turn is pivotally connected at its central portion to a shift lever 67. The shift lever 67 is pivoted at 68 to the frame and has a one-way coupling rigid in counterclockwise directions thereof to a hand lever 69, which rigid coupling in counterclockwise directions is provided by abutment of a lug 70 on the shift lever 67 against an edge 71 on the hand lever. A tension spring 72 connected between the levers maintains them normally in relative positions wherein the lug 70 abuts against the edge 71, but allows movement of the hand lever in counterclockwise directions relative to the shift lever with added tensioning of the spring 72. The hand lever 69 is biased lightly in a clockwise direction by a spring 73. This bias force is imparted through the rigid one-way coupling, just described, to the shift lever 67 to cause the stepped friction roller 28 to be urged against the drive roller 31 and capstan 27. Upon pressing the hand lever downwardly, the roller 28 is disengaged from the drive train and the roller 64 is brought in its place into contact with the drive roller 31 and capstan 27. Actually, the hand lever 69 is to be moved downwardly slightly beyond the point whereat the roller 64 so comes into engagement with the drive train so that the spring 72 will be further tensioned to press the roller 64 with some pressure against the coacting rollers of the drive train. Since the roller 64 is not stepped, the peripheral speed of the drive roller 31 is imparted to the capstan to cause a step-up in linear speed of the tape by the ratio of the radius of periphery 30 to periphery 29 of the stepped roller 28.

In Figure 3 there is shown diagrammatically a transfer machine 75 which comprises a tape transport mechanism of regular type including supply and take-up reels 76 and 77 and a tape drive mechanism including drive capstan 78 and pinch roller 79. Slidably engaging the reach of tape T between the reels is also a reproduce head 80 and opposite the head there may be a backing pad 81. The capstan and take-up reel are driven by a motor 82. Output oscillations from the reproduce head are amplified by an amplifier unit 83 diagrammatically represented, which unit may also include a source of erase current.

Leading from the transfer machine is a cable 84 comprising two leads 85 for supplying current to the drive motor 82, a pair of leads 86 for connecting the erase source to the erase head 35 of the juke box, and a pair of leads 87 for connecting the amplifier signal output to the record-reproduce head 32 of the juke box. The cable 84 terminates in a six-terminal plug 88 which is adapted for engaging a cooperating socket 89 at the back of the juke box. The socket has three pairs of terminals 90, 91 and 92 corresponding respectively to the circuits 85, 86 and 87. The terminals 90 are connected directly across the motor M so that when the transfer machine is plugged into the juke box its drive motor 82 will run simultaneously with the motor of the juke box; the terminals 91 are connected by leads 93 to the erase head 35; and the terminals 92 are connected by leads 94 to contacts 95 of the switch 61 so that when the switch 61 is thrown connection is made via the poles 59 to the record head 32.

The feature of the invention is to restrict the connecting of the transfer machine to the juke box to only authorized servicemen. In this connection the hand lever 69 is positioned normally to overlie the socket 89 and the start-stop mechanism 48, in which position it is latched by engagement of a pawl 96 with a pin 97 on the handle. The pawl is locked in its latching position by a lock 98 which may be a key-operable lock such as the lock 12 aforementioned. When the lock is turned by a suitable key the pawl is retracted from the pin 97 to free the hand lever for downward movement. As shown particularly in Figure 2, the lefthand portion of the hand lever 69 normally closes an opening 99 in the cabinet. When the handle is moved downwardly by the lug 69*a* projecting through the opening 99 the socket 89 and switch 48 are made accessible.

On the hand lever 69 there is a pin 100 which impinges against a pad 101 of the switch 61 to move the pole elements 59 into engagement with the contacts 95 concurrently as the friction roller 64 is moved into the drive train in place of the stepped roller 28 for conditioning the drive mechanism for high speed drive of the tape. Upon so shifting the hand lever into its downward position and thereupon inserting the plug 88 into the socket 89, the plug forms an abutment in the path of the hand lever to prevent its return until the plug is removed. In this downward position of the hand lever the spring 72 is placed under some tensioning for the purpose of holding the intermediate friction roller 64 in contact with the drive roller 31 and capstan 27 with some pressure.

From the foregoing description, it will be apparent that my invention contemplates, as features for preventing unauthorized replacement of recordations on the record medium of the juke box: (1) that the juke box cabinet be locked closed to prevent access to its circuitry and mechanism except by way of the panel 11 and the opening 99, and (2) that a lock be provided on the juke box which must be operated before connection can be made to replace any selected recordation on the record medium. With respect to the latter, the particular means shown to prevent unauthorized connection of a transfer machine to the juke box is intended only as an illustrative one for achieving my broad objective. Alternatively, for example, the socket 89 may be exposed continuously but the conditioning switch 61 may be thrown only by a special key. Also, such key operation of a conditioning switch 61 may serve to energize the erase head from a source within the juke box, and may condition the amplifier 62 and reconnect it for recording purposes so that no erase source or amplifier need be provided within the transfer machine itself.

From the foregoing description it will be apparent that the procedure for transferring a recordation from the transfer machine to one or another of the sound tracks on the record medium 13 of the juke box is as follows: The serviceman will first thread the transfer machine with the desired master recording in the usual way to condition the machine for playback operation. He will then move the knob 42 to the desired number to be erased and replaced by the new recording. Thereupon, he will unlock the handle 69 and move it downwardly, after which he will insert the plug 88 into the socket 89 and then release the handle. In so doing he has made operative connection of the transfer machine to the juke box and has conditioned the juke box for high speed operation. He will next close the manual switch 48 to start concurrently the juke box and the transfer machine, it being understood that the drive power for the transfer machine is being obtained through the juke box by way of the switch 48. As the machines then operate, the previous recording on the selected sound track is erased and concurrently the new recording is transferred from the master record on the transfer machine to the same sound track. When the transfer operation is completed the drive of the juke box is stopped automatically by engagement of the switch arms 56 with the conductive strip 57 on the tape of the juke box. If no further transfers are to be made, the serviceman simply pulls out the plug 88 to allow the handle 69 to return to its normal position and then relocks the handle, wherefore to restore the juke box to its normal condition.

A counter 102 is provided in the transfer machine for making a record of the number of transfers. This may be a regular form of counter operable by a pawl and ratchet mechanism 103. The pawl is operable by a solenoid 104 connected across the power line 85 by way of a special switch 105 controlled by the tape in the transfer machine. This special switch 105 may comprise a pair of vertically spaced contacts 106 on a post 107 across which the tape T is drawn as the machine is operated. At the end of the master recording there is on the tape T a short section covered by conductive material so that when this section crosses the contacts 106 the circuit of the solenoid 104 is closed across the power line 85 to cause a momentary operation of the solenoid and a step advance of the counter. Since the counter is actuated only at the end of the tape T it provides a record only of the number of complete transfers made. In other words, if for any reason it is necessary to stop the machine before a complete transfer is made and to start again at the beginning the counter will in such instance be not actuated so that no false registrations will be made.

The embodiment of my invention herein particularly described is intended to be illustrative and not limitative of my invention since the same is subject to changes and modifications without departure from the scope thereof, which I endeavor to express by the following claims.

I claim:

1. In combination with a selective repeat-type phonographic machine having a movable magnetic record medium bearing a plurality of separate recordations and means for conditioning the machine for playing a desired recordation: means for driving said record medium at normal playing speed and for automatically stopping the record medium on termination of playing the desired recordation; record-cooperable erase and record heads; shiftable control means for said heads for rendering the same operable for erasing a preselected recording from said record medium and for concurrently recording a selected new recordation on said medium in replacement thereof; a phonographic transfer machine having an output circuit adapted to be connected to said repeat-type phonographic machine for feeding signal energy of said selected new recordation to said record head; means for coupling said output circuit of said transfer machine to said phonographic machine and for rendering said erase means operative; and key operable lock means in operative association with said last stated means for placing the latter in operative and inoperative conditions.

2. In combination: a selective repeat-type phonographic machine having a movable magnetic record medium bearing a plurality of separate recordations in respective side-by-side tracks; a recording-reproducing head shiftable laterally of said record medium; selector means for shifting said head into registration with a selected track for playing a particular recordation; means for driving said record medium at normal playing speed and for stopping the record medium on termination of playing the particular recordation; a normally inoperative erasing head carried with said recording-reproducing head, said heads being adapted when respectively energized for erasing a selected recordation according to the positioning of said selector means and for supplying a new recordation in replacement thereof; a reproducing, transfer machine having operating mechanism for playing selected master recordings and feeding sound-representing oscillations therefrom to said recording-reproducing head; an activatable source of erase energy for energizing said erase head; means for connecting said output circuit to said record head and for connecting said erase source to said erase head; and unitary means for locking both of said connecting means in their unoperated positions.

3. In combination: a repeat-type phonograph having a movable magnetic record medium bearing a plurality of separate recordations, record-cooperable head means, and control means for selectively playing said recordations one at a time; a reproducing, transfer machine connectable to said repeat phonograph for erasing a selected recordation and recording a different musical selection in its place; a counter; and means responsive to each complete transfer of a recording from said transfer machine to said phonograph for advancing said counter one step to register the total number of such transfers.

4. In combination: a repeat-type phonograph having a movable record medium bearing a plurality of separate recordations, record drive means, record-cooperable record-reproduce head means, controllable erase head means cooperable with the record medium in advance of said record-reproduce head means and control means for selectively playing said recordations one at a time; a reproducing, transfer machine adapted to be loaded with a tape record medium bearing a selected recordation and including a reproducing head and means to drive said record medium in scanning relation to said head to produce sound-representing electric oscillations corresponding to said selected recordation: means for rendering said erase head means operative and for feeding said oscillations to said head means of said record-reproduce phonograph to transfer thereto a recordation from said transfer machine; a counter; and means for operating said counter once during each transfer of a recording from said transfer machine to said phonograph comprising actuating means, and control means for said actuating means including a length of the tape medium in the transfer machine at the end of the recordation adapted for operating said control means to cause an actuation of the counter at the completion of a transfer from the transfer machine to the phonograph.

5. In a repeat-type phonograph: the combination of a movable magnetic record medium bearing a plurality of separate recordations; record-reproduce and erase head means selectively cooperable with said record medium; means for driving said medium at normal playing speed for selective reproduction of said recordations; normally disabled circuit means for connecting external sources of record and erase current to said record-reproduce and erase head means respectively; and means for abling said circuit means and concurrently adjusting said drive means for moving said record medium at an increased speed.

6. In a repeat-type phonograph: the combination of a movable magnetic record medium bearing a plurality of separate recordations; record, reproduce and erase head means selectively cooperable with said record medium; means for driving said medium at normal playing speed for selective reproduction of said recordations; a sound speaker; record and erase circuits to be connected to external sources of record and erase current; switch means movable alternatively into first and second positions and effective for connecting said reproducer element of said head means to said sound speaker or for connecting said record and erase elements of said head means respectively to said record and erase circuits; means for conditioning said drive means for fast drive of said record medium; and shiftable means operatively coupled to said switch means and conditioning means for connecting said element to said speaker as said drive means is conditioned for normal operation and to connect said record and erase elements to said record and erase circuits respectively as said drive means is conditioned for fast operation.

7. The combination set forth in claim 6 including plug-type coupling elements for making connection to said erase and record current circuits, one of said coupling elements being mounted on said phonograph; and means operable with said shiftable means for preventing access to said one coupling element when said switch means is in said first position.

8. In a repeat-type phonograph: the combination of a movable magnetic record medium bearing a plurality of separate recordations; record-reproduce and erase head means selectively cooperable with said record medium; means including a motor for driving said medium at normal playing speed for selective reproduction of said recordations; a transfer machine including a drive motor; circuit means connectable between said transfer machine and said phonograph for feeding oscillations from said transfer machine to the head means of said phonograph and for feeding driving power from said phonograph to the drive motor of said transfer machine; and a start-stop switch in the circuit of the drive motor of said phonograph rendered operative by said circuit means as the same are connected for starting and stopping the drive motor of said transfer machine concurrently as the drive motor of said phonograph is started and stopped.

9. In a repeat-type phonograph adapted for connection to a source of A.-C. power: the combination of a movable magnetic record medium bearing a plurality of separate recordations; a record-reproduce head means; an erase head means; a unitary carriage for said head means; carriage-moving means for selectively operatively associating said head means with different portions of said record medium; a reproducer circuit connected to said record-reproduce head means; drive means for said record medium including a start-stop switch; a record circuit; a power circuit connectable to said A.-C. power source by said start-stop switch; means for making external connection to said erase head, power circuit and record circuit including plug type coupling elements one of which is fixedly mounted on the phonograph; a guard member overlying said one connector element and shiftable therefrom to expose the same; means for locking said guard member in its said overlying position; switch means operable by said guard member as the same is shifted to expose said one connector element for disconnecting said record-reproduce head means from said reproducer circuit and connecting the same to said record circuit; and means mounting said guard member for movement transversely of said one connector element to cause the guard member to be retained in its shifted position by the other of said connector elements when the connector elements are inter-engaged with each other.

References Cited in the file of this patent

UNITED STATES PATENTS

| | | |
|---|---|---|
| 2,281,403 | Barrish | Apr. 28, 1942 |
| 2,396,409 | Berzer | Mar. 12, 1946 |
| 2,499,700 | Tinkham et al. | Mar. 7, 1950 |
| 2,519,725 | White | Aug. 22, 1950 |
| 2,560,234 | Masterson | July 10, 1951 |
| 2,604,549 | Begun | July 22, 1952 |
| 2,620,405 | Schickel | Dec. 2, 1952 |
| 2,694,110 | Roberts | Nov. 9, 1954 |

OTHER REFERENCES

Elements of Magnetic Recording, Shaney, 1950, page 97.

Radio and Television News, April, 1952, pgs. 40, 41, and 134.